M. M. ADAMS 2,941,396

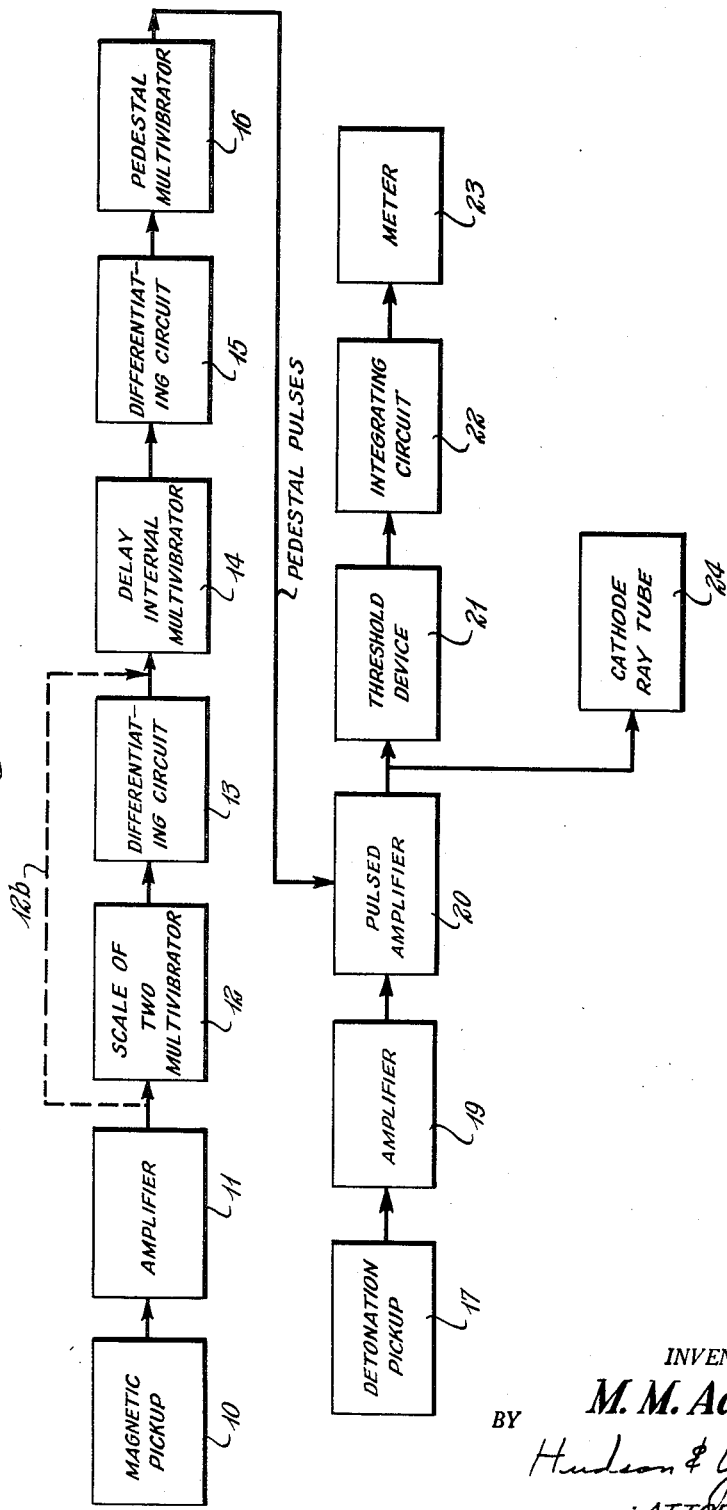

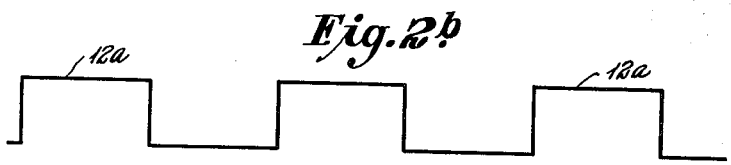
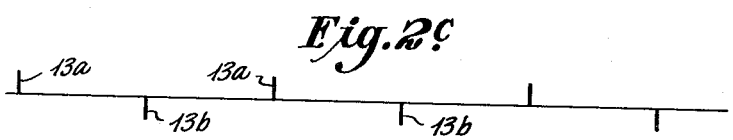
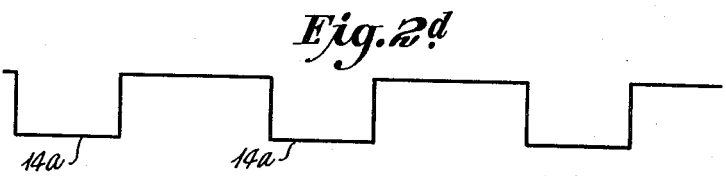
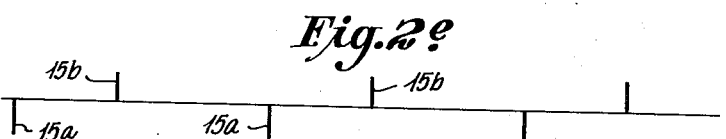
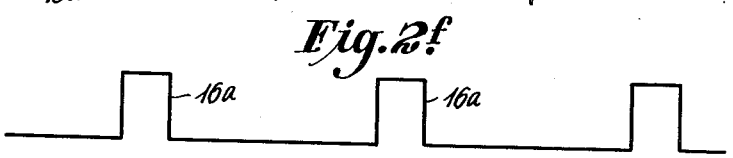
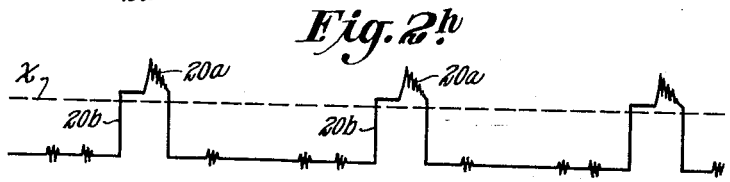
INVENTOR.
M. M. Adams INVENTOR.
M. M. Adams
BY Hudson & Young
ATTORNEYS June 21, 1960

ELECTRONIC ENGINE ANALYZER

Filed July 2, 1953

4 Sheets-Sheet 4

INVENTOR.
M. M. Adams
BY
Hudson & Young
ATTORNEYS

United States Patent Office 2,941,396
Patented June 21, 1960

2,941,396

ELECTRONIC ENGINE ANALYZER

Max M. Adams, Bartlesville, Okla., assignor to Phillips Petroleum Company, a corporation of Delaware Filed July 2, 1953, Ser. No. 365,758

7 Claims. (Cl. 73—35)

This invention relates to apparatus for measuring fluctuations of a variable occurring within a preselected time interval, usually during each of a plurality of recurring cycles of operation. In another aspect, it relates to apparatus for analyzing detonation occurring in a multi-cylinder internal combustion engine. In still another aspect, it relates to a novel calibrating circuit for a detonation analyzer.

With the increasing interest in detailed and accurate analysis of detonation phenomena, a number of electronic instruments have been devised yielding valuable qualitative and quantitative information regarding combustion and detonation in internal combustion engines.

It is the purpose of this invention to produce an extremely flexible instrument of this type which enables the operator to determine the time during each cycle of engine operation, i.e., the crank shaft angle, at which an event of interest, such as detonation, is occurring. In addition to obtaining improved results in the study of detonation phenomena, the instrument is of wide applicability where the amplitudes of signals of interest must be accurately related to time or phase angles. In connection with the foregoing, the apparatus of this invention is provided with a calibrating circuit which enables it to be accurately calibrated initially for the purpose of making such measurements.

Accordingly, it is an object of the invention to provide an improved instrument for the analysis of detonation phenomena.

It is a further object of the invention to provide a simple and accurate circuit whereby amplitudes of cyclically recurring signals can be related to time and/or phase of other signals.

It is a still further object to provide a calibrating circuit of novel construction and arrangement.

It is a still further object to provide a circuit which is very simple, accurate in operation, and utilizes a minimum number of standard circuit components.

Figure 3:
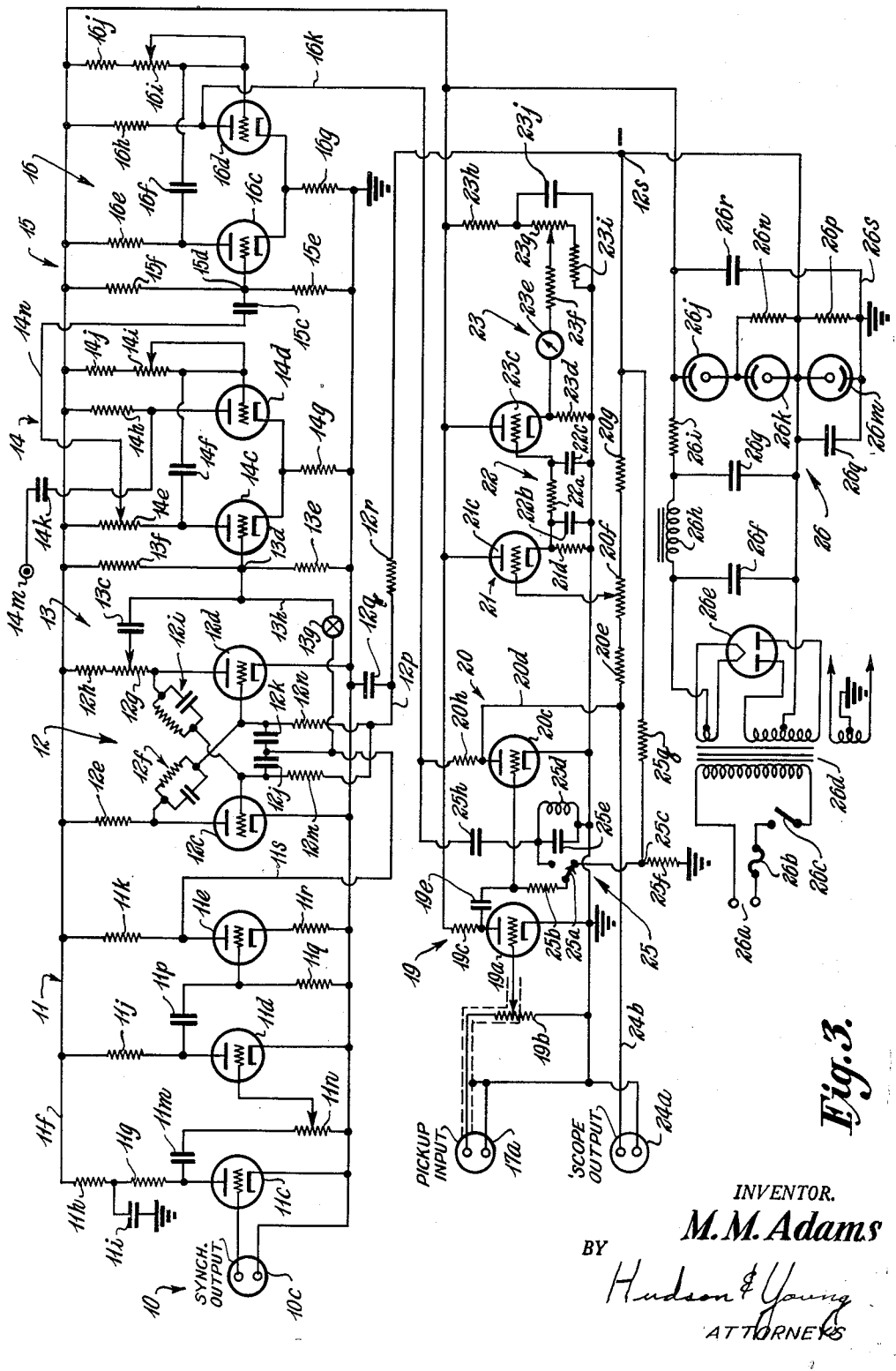
Figure 4:
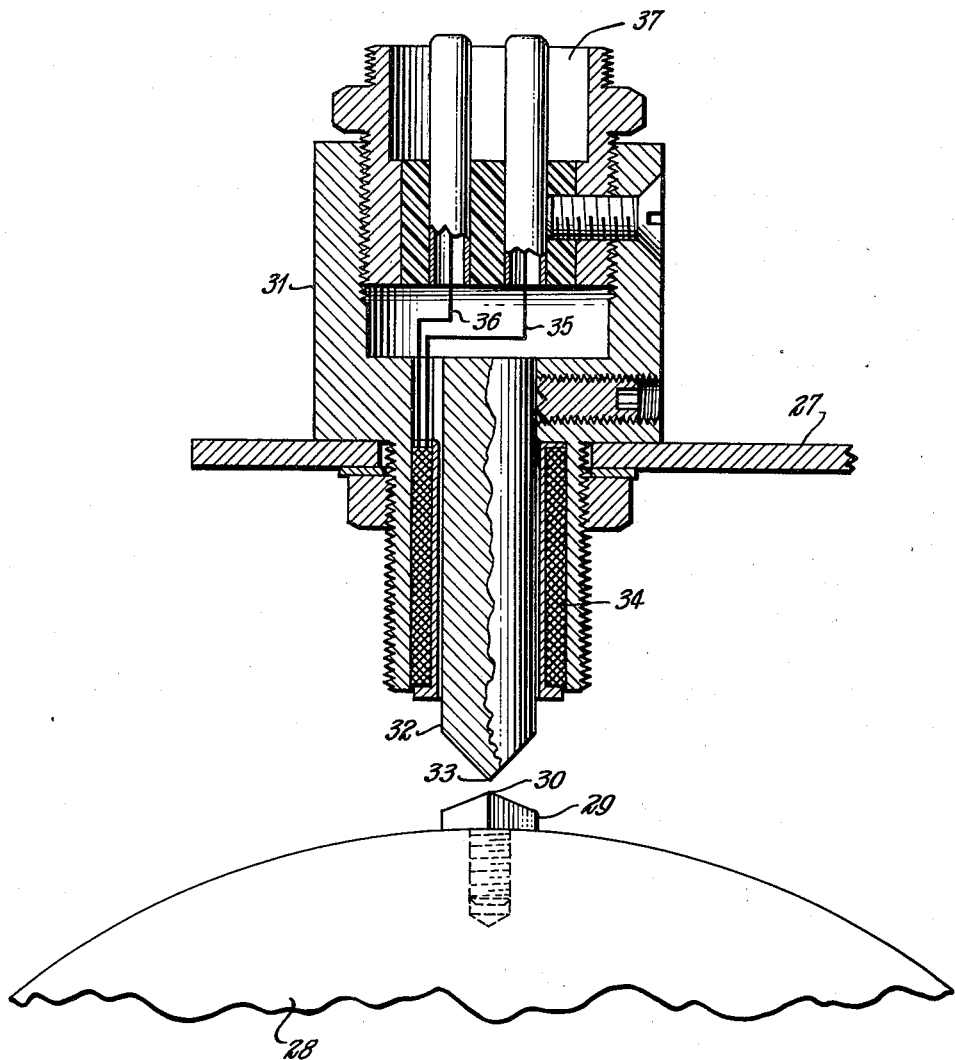

Various other objects, advantages and features of the invention will become apparent from the following detailed description, taken in conjunction with the accompanying drawings, in which:

Figure 1 is a block diagram of a circuit constructed in accordance with this invention;

Figures 2a to 2h, inclusive, are graphs illustrating the wave forms at various portions of the circuit of Figure 1;

Figure 3 is a schematic circuit diagram of a preferred embodiment of the invention; and Figure 4 is a vertical sectional view, partially in elevation, of a flywheel pick-up suitable for use in the circuit of this invention.

Referring now to Figures 1 and 2, I provide a pick-up 10 which produces one or more timing signals 10a, preferably during each cycle of the event of interest, these signals occurring at a fixed time during each cycle of operation. When the circuit is applied to the measurement of detonation phenomena, pick-up 10 can conveniently be an electromagnetic pick-up associated, as shown in Figure 4, with the flywheel of the engine and arranged to produce one or more electrical pulses during each flywheel revolution. The type of pick-up to be used is not restricted to a magnetic pick-up, as any transducing device can be utilized which produces one or more timing signals at predetermined times during each cycle of operation. In the case of an internal combustion engine, the timing pulses can be derived from the crankshaft, distributor shaft, or from other sources as those skilled in the art will understand. Where non-cyclic phenomena are to be investigated, a pulse can be fed to pick-up 10 at any desired time and, in accordance with the invention, the indicating channel will be sensitized for a predetermined period a preselected interval after the timing pulse is received.

The timing signals or pulses from pick-up 10 are fed to an amplifier 11 and, thence, through a scale-of-two multivibrator 12 and a differentiating circuit 13 to a delay interval multivibrator 14. Multivibrator 12, in conjunction with differentiating circuit 13, is arranged to produce one output pulse for each two input pulses fed thereto. Referring to Figure 2, it will be noted that each odd timing pulse 10a initiates a rectangular wave 12a in multivibrator 12 and each even pulse 10a terminates a rectangular wave 12a. Differentiating circuit 13 produces a positive pulse 13a coincident in time with the leading edge of each square wave 12a and a negative pulse 13b coincident in time with the trailing edge of each rectangular wave 12a. Thus, one negative pulse 13b is produced for each pair of timing pulses 10a fed to the pick-up 10.

The purpose of multivibrator 12 and differentiating circuit 13 in the analysis of detonation phenomena will be evident when it is realized that, in a two cycle engine, one revolution of the flywheel occurs for each cycle of engine operation whereas, in a four cycle engine, there are two flywheel revolutions per cycle of engine operation. Thus, in a two cycle engine, one pulse 10a is produced for each cycle of engine operation and the multivibrator 12 and differentiating circuit 13 can be disconnected from the apparatus, as indicated by dotted line 12b. With a four cycle engine, however, the input signals are fed through multivibrator 12 and differentiating circuit 13 so that one positive pulse 13a is provided for each two cycles of flywheel revolution or for each single cycle of engine operation.

It follows, from the foregoing, that where more than two timing signals are produced during each cycle, circuits 12 and 13 can be modified to reduce the number of pulses so that only one output pulse occurs for each cycle of operation. For example, if eight timing pulses were produced per cycle, three circuits 12, 13 could be used in cascade to provide one output pulse for each eight input pulses.

Each positive pulse 13a, where circuits 12, 13 are utilized, or each timing pulse 10a, where circuits 12, 13 are disconnected, is fed to delay interval multivibrator 14. When triggered by a positive pulse, multivibrator 14 produces a rectangular wave 14a, the leading edge of which is coincident in time with the pulse 13a or 10a fed to the circuit, the trailing edge occurring a fixed definite time interval thereafter. The width of the rectangular waves 14a can be adjusted by varying the circuit constants of the multivibrator so that the trailing edge of rectangular wave 14a can occur at any desired time interval after the initiation thereof. The rectangular waves 14a are fed to a differentiating circuit 15 which produces a negative pulse 15a coincident in time with the leading edge of each rectangular wave 14a. It will be noted, therefore, that a positive pulse 15b is produced corresponding to each positive pulse 13a or 10a and delayed with respect thereto an amount determined by the circuit constants of the multivibrator 14.

Positive pulses 15b from differentiating circuit 15 trigger a pedestal multivibrator 16 with the result that a rectangular wave 16a is produced thereby for each positive pulse fed to the circuit, the leading edge of the rectangular wave being coincident in time with the generating positive pulse 15b, and the trailing edge of the rectangular wave occurring a fixed definite time thereafter, as determined by the circuit constants of multivibrator 16. These circuit constants can be adjusted, as will be hereinafter explained, to vary the width of the rectangular waves or pedestal pulses 16a. The pedestal pulses are fed to a pulsed amplifier operating in the manner to be presently described.

It will be evident that the foregoing circuits constitute a channel which produces a pedestal pulse of a desired preselected width which occurs at a preselected time during each cycle of operation of the system to be investigated. Where non-cyclic phenomena are to be studied, the aforesaid channel produces a pedestal pulse of predetermined width delayed a predetermined interval from the occurrence of each initiating pulse 10a fed to pick-up 10 or, where circuits 12, 13 are utilized, a pedestal pulse is produced corresponding to each second or "nth" pulse fed to the pick-up 10.

The indicating channel will now be described, this channel including a pick-up 17 producing an electrical voltage representative of the amplitude or other variable of the system to be investigated. Where detonation phenomena occurring in an internal combustion engine are investigated, transducer 17 can be, without limitation, an internal type velocity pick-up, an external type velocity pick-up, a catenary type pressure pick-up, a crystal microphone, or an ionization gap. Preferably and advantageously, the pick-up is so located as to be sensitive to detonation occurring in each cylinder of the internal combustion engine under test.

Figure 2g illustrates signals representative of pressure changes in a single cylinder of an internal combustion engine. It will be noted that this wave includes a low frequency component 18a upon which are superimposed components 18b, 18c and 18d representative of valve opening and closing together with component 18e representative of detonation. It will be understood that a generally similar wave is produced as a result of the operation of each other cylinder in the engine under test.

Electrical signals produced by the pick-up 17 are passed through an amplifier 19 to a pulsed amplifier 20 which is constructed and arranged so as to superimpose a part of the amplified signal upon the pedestal pulse, the rest of the amplified signal being uneffected. Assuming that the wave form in Figure 2g is that of the cylinder it is desired to investigate, the delay interval of multivibrator 14 is so adjusted that pedestal pulse 16a is coincident in time with the occurrence of detonation wave 18e. As a result, the detonation component 18a in the selected cylinder is superimposed upon the pedestal voltage, and the resulting signals are passed to a threshold device 21. The wave form of the signals passing through the gate circuit is shown in Figure 2h wherein it will be noted that a detonation component 20a corresponding to detonation component 18e is superimposed upon a pedestal 20b corresponding to pedestal 16a. It will be evident that the width of the pedestal pulse 16a can be adjusted through changing the circuit constants of multivibrator 16 so that the instrument is sensitive during the entire interval or any part thereof wherein detonation is occurring in the cylinder under investigation. Should it be desired to investigate detonation in another cylinder, the delay interval of multivibrator 14 is adjusted until pedestal pulse 16a is coincident in time with the detonation occurring in such other cylinder. In this fashion, any particular desired cylinder can be, in effect, isolated and looked at separately, and the operator at all times knows the crank shaft angle at which the detonation is occurring. Alternatively, other events of interest, such as the opening and closing of a particular valve, can be isolated for observation by proper adjustment of the delay interval and pedestal width.

Threshold device 21 permits only signals of greater than a predetermined amplitude, as indicated by line X, to pass through the circuit. The output of threshold device 21 is fed to an integrating circuit 22 and, thence, to an indicating device 23 which produces an output representative of the average intensity of detonation in the particular cylinder under stests, signals occurring at other times during the cycle being eliminated, since they are not of sufficient magnitude to pass through the threshold tube. If desired, the wave form at the output of the pulsed amplifier 20 can be observed by a cathode ray tube 24, both the signals superimposed upon the pedestal and signals occurring at other times during the cycle being visible upon the screen. This is advantageous, in that it enables the pedestal to be readily related to a definite engine cylinder upon starting of a test.

In addition to the operation, as described, wherein detonation is measured in a selected cylinder of a test engine, the described instrument has many diversified uses both in testing engine performance and for other purposes. In particular, utilizing a research method engine, and feeding the signals to pick-up 10, which was a crystal microphone sensitive to the audible signal emanating from the crank case door, tests were conducted on the rating of fuels on two different engines operating from the 80 octane level to the 148 performance level. The meter stability of this audible indication in the range above 100-octane number was greatly improved over that obtained with existing instruments, a spread of approximately twelve divisions per octane number being attained in the 90-octane level.

Further, the utilization of the present instrument on an engine wherein the output produced by an internal type pick-up varied in an erratic manner with respect to crank shaft angle when auto-ignition or pre-ignition was occurring, permitted these conditions to be readily and clearly observed by erratic and immediately obvious movements of the wave form toward the leading edge of the pedestal pulse. Thus, proper selection of gate width, with due regard to normal phase eccentricities, enables the instrument to be utilized to identify incipient auto-ignition and pre-ignition.

Also, the present instrument is advantageously used in determining the principal frequency present in the detonation pick-up output, and improved results are obtainable in plotting pressure-crank shaft angle curves from which power ratings may be obtained. In addition to the foregoing applications, highly useful results are obtained in any field where a variable is to measured in a cyclic system, or where an event of interest occurs a predetermined interval after an index signal is obtainable.

In Figure 3, I have shown a preferred embodiment of the circuit of this invention. It will be noted that this circuit includes input means, such as a jack 10c, into which a plug connected to the pick-up 10 can be inserted. This jack is connected to the input of amplifier 11 which includes three triodes 11c, 11d and 11e connected in cascade. The anode of triode 11c is connected to a positive power supply line 11f through series connected resistors 11g, 11h and a grounded filter condenser 11i connected to the junction between them. The anodes of triodes 11d and 11e are connected to positive power supply line 11f through the respective voltage-dropping resistors 11j, 11k. The anode of tube 11c is further connected through a coupling condenser 11m to a potentiometer 11n, which serves both as a gain control and as the grid resistor of tube 11d. The anode of tube 11d is coupled to the control grid of tube 11e by a coupling condenser 11p, and tube 11e has a grid resistor 11q and a cathode bias resistor 11r. Amplified signals are fed from tube 11e by a lead 11s to the input of scale-of-two circuit 12.

Scale-of-two circuit 12 includes two triodes 12c and 12d, the anode of tube 12c being connected through a dropping resistance 12e to the positive power supply line, and to the control grid of tube 12d through a resistance-capacitance unit 12f. The anode of tube 12d is connected to the positive power supply line through a potentiometer 12g and a fixed resistance 12h, this anode further being connected to the control grid of tube 12c by a resistance-capacitance unit 12i. The cathodes of tubes 12c, 12d are connected directly to ground, and their control grids are connected through the respective coupling condensers 12j, 12k to input lead 11s. The control grids are further connected through fixed resistors 12m, 12n to a lead 12p which is negative with respect to ground. A grounded filter condenser 12q is connected to lead 12p, and this lead is further connected through a fixed resistance 12r to a negative power supply terminal 12s.

Scale-of-two circuit 12 is so constructed that one tube 12c or 12d is normally conducting while the other tube is non-conductive. When a negative pulse is fed to the circuit, the conductive tube has its grid biased below cut off with the result that conduction stops, and the resultant increase in plate voltage is transmitted through resistance-capacitance unit 12f or 12i to the control grid of the non-conductive tube, causing it to become conductive. The next negative pulse fed to the system causes the circuit to return to its initial condition. Thus, referring to Figure 2, it will be evident that each odd negative pulse fed to the system initiates a rectangular wave which is terminated by the succeeding even pulse.

The output of scale of two circuit 12 appears at the contactor of potentiometer 12g and is impressed upon differentiating circuit 13 which includes a condenser 13c connected to a junction 13d having attached thereto a grounded fixed resistor 13e, and a fixed resistor 13f attached to the positive power supply line. This circuit differentiates the rectangular wave 12a (Figure 2) and produces alternate positive pulses 13a and negative pulses 13b, as shown in Figure 2c. It will be noted that scale of two circuit 12 and differentiating circuit 13 can be cut out by closure of a switch 13g in a lead 13h which feeds the input pulse appearing at conductor 11s directly to junction 13d, thereby short-circuiting units 12 and 13.

From the junction 13d of differentiating circuit 13, signals are fed to multivibrator 14 which includes two triodes 14c and 14d. The anode of tube 14c is connected through a potentiometer 14e to the positive power supply line, and through a condenser 14f to the control grid of tube 14d. The cathodes of both tubes are interconnected, and grounded, through a fixed resistance 14g. The anode of tube 14d is connected through a fixed resistance 14h to the positive power supply line, and the control grid of tube 14d is connected to the positive power supply through a variable resistance 14i connected in series with a fixed resistance 14j. The anode of tube 14d is further connected through a coupling condenser 14k to a terminal 14m for connection to the synchronizing terminals of a cathode ray oscilloscope.

Assuming that tube 14d is conducting and tube 14c is non-conductive, a positive pulse impressed upon the control grid of tube 14c will cause it to become conductive. The resulting decrease in plate potential is passed through the resistance-capacitance unit consisting of condenser 14f and resistances 14i, 14j to the control grid of tube 14d. After a predetermined interval, determined by the setting of variable resistance 14i, tube 14d momentarily becomes non-conductive, thereby causing a pulse to be transmitted to the cathode of tube 14c restoring it to a non-conductive condition. Accordingly, each time a negative pulse 13b, Figure 2c, is fed to circuit 14, a rectangular wave 14a is produced, the width of which is determined by the setting of variable resistance 14i. The provision of terminal 14m permits the sweep of a cathode ray oscilloscope to be synchronized with the leading edge of the rectangular wave produced by circuit 14a.

The output of multivibrator 14 is withdrawn by a conductor 14n from the contactor of potentiometer 14e and passed to differentiating circuit 15 which includes differentiating condenser 15c, a junction 15d, a grounded fixed resistance 15e connected to the junction and a fixed resistance 15f connecting junction 15d to the positive power supply line. The differentiating circuit, in well understood fashion, produces negative and positive pulses 15a and 15b corresponding respectively to the leading and trailing edges of the square waves 14a, Figures 2d and 2e.

Pulses from differentiating circuit 15 are fed to pedestal multivibrator 16 having parts 16c to 16j corresponding in structure and function to the similarly lettered parts of multivibrator 14. Hence, these parts and their operation need not be described in detail. It will be noted that the output of multivibrator 16 is withdrawn as positive rectangular waves by a lead 16k attached to the anode of tube 16d, and that variable resistance 16i controls the width of the rectangular waves produced by the multivibrator, as explained in connection with multivibrator 14. The manner of application of these pulses to the pulsed amplifier will be hereafter described in detail.

The indicating channel incorporates a pick-up jack 17a into which a suitable pick-up, as described in connection with pick-up 17, Figure 1, is plugged. Amplifier 19 includes a triode 19a, the control grid of which is connected to the contactor of a potentiometer 19b having one terminal grounded and its other terminal connected to the pick-up input jack 17a. The cathode of tube 19a is grounded and its anode is connected through a voltage dropping resistor 19c to the positive power supply line. The output of amplifier tube 19a is fed through a coupling condenser 19e to the control grid of a triode 20c in the gate circuit 20.

The cathode of tube 20c is connected directly to ground, and its anode is connected by a conductor 20d, a fixed resistor 20e, a potentiometer 20f and a fixed resistor 20g to the negative power supply terminal 12s. Thus a low positive potential is ordinarily applied to the anode of tube 20c so that it will conduct. The anode of tube 20c is also connected through a fixed resistance 20h to the lead 16k upon which the pedestal pulses from multivibrator 16 are impressed.

When a pedestal pulse is present at conductor 16k, the anode voltage of tube 20c becomes considerably more positive. Since the anode of tube 20c is directly coupled to the control grid of tube 21c through resistor 20e and potentiometer 20f, the pedestal pulse remains at its original high level throughout, and does not decrease in amplitude with time, as would be the case if condenser coupling were used.

It will be noted that a jack 24a is provided for connection to cathode ray tube 24, Figure 1, one terminal of this jack being grounded and the other terminal being conducted by a lead 24b to the anode of tube 20c.

Threshold device 21 incorporates a triode 21c having its anode connected directly to the positive power supply line and having its control grid connected to the contactor of potentiometer 20f so that a variable negative bias voltage is impressed upon the control grid of this tube. The cathode of tube 21c is connected to ground through a fixed resistor 21d. As a result, only signals of greater than a predetermined amplitude X, Figure 2h, pass through tube 21c, the predetermined amplitude being determined by the setting of potentiometer 20f.

The cathode of tube 21c is also connected to integrating circuit 22 which includes a fixed resistance 22a and two grounded integrating condensers 22b and 22c. This integrating circuit averages the voltage pulses fed thereto from threshold device 21 and, therefore, produces a voltage representative of the average intensity of the signal passing through the indicating channel.

The circuit of meter 23 includes a triode 23c having its control grid connected to the output of integrating circuit 22, its anode connected directly to the positive supply terminal, and its cathode grounded through a fixed resistance 23d. A meter 23e has one terminal thereof connected to the cathode of tube 23c and its other terminal connected in a network which includes a fixed resistance 23f attached to the contactor of a potentiometer 23g which is connected in series with fixed resistances 23h and 23i between ground and the positive power supply line, a condenser 23j being connected in parallel with fixed resistor 23i and potentiometer 23g. The meter circuit 23 is intended to be illustrative only, and may include any usual type of indicating or recording circuit. Thus, by the term "indicating device" or its derivatives in the appended claims, I intend to cover both indicating and recording circuits or combinations thereof.

It will be evident that the operation of the circuit is similar to that described in connection with the block diagram of Figure 1. The indicating channel is conductive only when a pedestal pulse is applied from lead 16k to gate circuit 20, the circuit functioning as a detonation-indicating circuit when the pedestal pulse is present. At other times, the indicating circuit is cut off, although the entire wave form of the incoming signals and the pedestal pulses can be observed upon an oscilloscope fed by jacks 24a. Further, the width of the pedestal pulse, and the time at which it occurs in the operating cycle can be regulated as desired by adjustment of fixed resistances 14i and 16i.

It is a feature of the invention that a novel calibrating circuit is provided by which the width of the pedestal pulse can be accurately measured. This circuit is indicated generally by reference numeral 25 and includes a switch 25a by which a fixed resistance 25b constituting the grid resistor of tube 20c can be selectively connected either to a junction 25c maintained at a suitable negative potential, or to a resonant circuit including an inductance 25d connected in parallel with a condenser 25e. Junction 25c is maintained at a fixed negative potential by a grounded fixed resistance 25f and by its connection with negative terminal 12s through a fixed resistance 25g. With switch 25a in its lower position, therefore, the circuit functions in the manner already described as a gate circuit which is operable only when a pedestal pulse is present at conductor 16k.

With switch 25a in its upper position, resonant circuit 25d, 25e is connected in the grid circuit of tube 20c. This resonant circuit is also coupled by a condenser 25h to the lead 16k upon which the pedestal pulses are impressed. Thus, with switch 25a in its upper position, resonant circuit 25d and 25e is shock excited by the leading edge of the pedestal pulse and the oscillations of this circuit are superimposed upon the pedestal pulse and can be seen as a trace upon a cathode ray tube connected to jack 24a. Since the resonant frequency of circuit 25d, 25e is known, by counting the number of cycles of the oscillatory wave produced by the resonant circuit superimposed upon the pedestal pulse, the duration of the latter can be very accurately measured. For example, if resonant circuit 25d, 25e is tuned to five kilocycles, each cycle of oscillation appearing superimposed upon the pedestal pulse will correspond to a time interval of 0.2 millisecond. In this fashion, the width of the gate pulses can be very accurately and conveniently adjusted.

The circuit of Figure 3 further includes a power supply unit 26 of generally conventional construction, this circuit including alternating current input terminals 26a, a fuse 26b, a switch 26c, a power transformer 26d, a full wave rectifier 26e, filter condensers 26f, 26g, a filter inductance 26h, a filter resistance 26i, voltage regulator tubes 26j, 26k, 26m, filter resistors 26n, 26p and filter condensers 26q, 26r. This power supply system provides a zero potential at ground lead 26s, a potential negative with respect to ground at terminal 12s and a positive potential at positive power supply lead 11f.

In Figure 4, I have shown a suitable electromagnetic pick-up capable of producing one or more electrical pulses at each revolution of the flywheel of an internal combustion engine. This unit is mounted upon a bracket 27 adjacent a flywheel 28 which is provided with a radially protruding hexagonal head bolt 29 having a knife edge 30 extending transversely of the surface of the flywheel. Mounted in bracket 27 is a transducer which includes a generally cylindrical casing 31 supporting a cylindrical permanent magnet 32 having its outer edge shaped to form a knife edge 33 adjacent which passes the knife edge 30 upon revolution of the flywheel. Surrounding the magnet 32 is a coil 34 having two terminal leads 35 and 36 extending to a two prong male connector 37. It will be evident that, as the flywheel rotates, a pulse is produced each time the knife edge 30 passes adjacent knife edge 33 so that one pulse is produced at a definite time during each flywheel revolution. Of course, more than one pulse can be produced during each flywheel revolution by suitably positioning one or more hexagonal nuts 39 of the type shown in another portion on the flywheel.

From the foregoing description, it will be evident that I have achieved the objects of my invention in providing a novel circuit for the analysis of cyclically occurring phenomena, and even non-cyclically occurring phenomena, where a time interval must be accurately measured from a fixed reference time. By this circuit, the occurrence of detonation in a selected cylinder of an internal combustion engine can be readily singled out for observation, and the cylinder to be observed can be readily selected by varying the delay imposed by multivibrator 14, Figure 3, through adjustment of variable resistance 14i. Further, the width of the pedestal pulse controlling the operation of the indicating circuit can be varied by adjustment of variable resistance 16i, and the pedestal pulse width can be accurately measured through use of the calibrating circuit 25. Finally, it will be evident that the device has general utility in the measurement of phenomena other than detonation phenomena.

While the invention has been described in connection with a present, preferred embodiment thereof, it is to be understood that this description is illustrative only and is not intended to limit the invention.

I claim:

1. Apparatus for analyzing the operation of an internal combustion engine having a flywheel which undergoes recurring cycles of engine operation, said apparatus comprising, in combination, an electromagnetic pick-up operatively associated with said flywheel to produce an electrical timing pulse at a fixed time during each cycle of flywheel operation, means connected to said pick-up and responsive to said timing pulses to produce a delayed timing pulse at a preselected interval after the occurrence of said fixed time, means for varying said preselected interval, means responsive to each delayed timing pulse to generate a pedestal pulse in fixed time relation to the corresponding delayed timing pulse, means for varying the width of such pedestal pulses, a detonation pick-up producing an electrical voltage representative of detonation occurring in said engine, means including a pulsed amplifier fed by said detonation pick-up, said pulsed amplifier means being conductive when a pulse is fed thereto and non-conductive in the absence of a pulse, a detonation-indicating circuit fed by said pulsed amplifier means, and means for applying said pedestal pulses to said pulsed amplifier.

2. Apparatus for analyzing the operation of an internal combustion engine having a flywheel which undergoes recurring cycles of engine operation, said apparatus comprising, in combination, an electromagnetic pick-up operatively associated with said flywheel to produce an electrical timing pulse at a fixed time during each cycle of flywheel operation, means responsive to said circuit to produce a delayed timing pulse at a preselected interval after the occurrence of each timing pulse, means for varying said preselected interval, means responsive to each delayed timing pulse to generate a pedestal pulse in fixed time relation to the corresponding delayed timing pulse, a single detonation pick-up producing an electrical voltage representative of detonation occurring in a plurality of cylinders of said engine, a pulsed amplifier fed by said detonation pick-up, a detonation indicating circuit fed by said pulsed amplifier, and means for applying said pedestal pulses to said pulsed amplifier to cause a portion of said electrical voltages to be superimposed upon the pedestal pulses.

3. Apparatus for analyzing the operation of an internal combustion engine having a flywheel which undergoes recurring cycles of engine operation, said apparatus comprising, in combination, an electromagnetic pick-up operatively associated with said flywheel to produce an electrical timing pulse at a fixed time during each cycle of flywheel operation, means responsive to each timing pulse to generate a pedestal pulse in fixed time relation to the corresponding timing pulse, means for varying the width of such pedestal pulses, a single detonation pick-up producing an electrical voltage representative of detonation occurring in a plurality of cylinders of said engine, a pulsed amplifier fed by said detonation pick-up, a detonation-indicating circuit fed by said pulsed amplifier, and means for applying said pedestal pulses to said pulsed amplifier to cause a portion of said electrical voltages to be superimposed upon the pedestal pulses.

4. Apparatus for analyzing the operation of an internal combustion engine having a flywheel which undergoes recurring cycles of engine operation, said apparatus comprising, in combination, an electromagnetic pick-up circuit operatively associated with said flywheel to produce an electrical timing pulse at a fixed time during each cycle of flywheel operation, a scale-of-two multivibrator circuit fed by said first-mentioned circuit, a differentiating circuit fed by said scale-of-two multivibrator circuit, said differentiating circuit and said scale-of-two multivibrator circuit being arranged to produce one output pulse for each two timing pulses fed thereto, means responsive to each output pulse to generate a pedestal pulse in fixed timed relation to the corresponding output pulse, a detonation pick-up producing an electrical voltage representative of detonation occurring in said engine, a pulsed amplifier fed by said detonation pick-up, a detonation-indicating circuit fed by said pulsed amplifier, and means for applying said pedestal pulse to said pulsed amplifier to cause a portion of said electrical voltages to be superimposed upon the pedestal pulses.

5. In apparatus of the character described, a first channel including a pick-up input circuit, a tuned resonant circuit, a pulsed amplifier, means for selectively connecting said input circuit and said tuned resonant circuit to the input of said pulsed amplifier, and an indicating circuit fed by said pulsed amplifier, a second channel including a pulse input circuit, a multivibrator fed by said input circuit, a differentiating circuit fed by said multivibrator, the output of said differentiating circuit comprising pulses of one polarity substantially coincident in time with input pulses fed to the multivibrator circuit, and pulses of opposite polarity delayed in time from said pulses of one polarity by an amount determined by the width of the rectangular wave produced by said multivibrator, a second multivibrator responsive to said pulses of opposite polarity, means for feeding the pedestal pulses that are the rectangular waves generated by said second multivibrator to said pulsed amplifier to cause a portion of the electrical voltages appearing in said first channel to be superimposed upon the pedestal pulses the frequency of said electrical voltages being substantially greater than the frequency of said pedestal pulses, and display means connectable to the output of said pulsed amplifier to show the wave produced by said resonant circuit superimposed upon said pedestal pulse and thus permit accurate determination of the width of said pedestal pulse by counting the number of cycles of said wave thus superimposed.

6. In apparatus of the character described, a pick-up input circuit, a tuned resonant circuit, a pulsed amplifier, means for selectively coupling said input circuit and said tuned resonant circuit to said pulsed amplifier, a threshold device fed by said pulsed amplifier, said threshold device conducting only signals of greater than a predetermined amplitude, an integrating circuit fed by said threshold device, an indicating circuit fed by said integrating circuit, means independent of said input circuit for producing a recurrent series of pedestal pulses, means for feeding said pedestal pulses to said pulsed amplifier, the frequency of said tuned resonant circuit being substantially higher than the frequency of said pedestal pulses, and display means connectable to the output of said pulsed amplifier to show the wave produced by said resonant circuit superimposed upon said pedestal pulse and thus permit accurate determination of the width of said pedestal pulse by counting the number of cycles of said wave thus superimposed.

7. Apparatus for analyzing the operation of an internal combustion engine having a flywheel which comprises, in combination, an electromagnetic pick-up associated with said flywheel to produce an electrical pulse at each revolution of the flywheel, a detonation pick-up associated with said engine to produce an electrical output representative of detonation, a tuned resonant circuit, a pulsed amplifier, means for selectively connecting said detonation pick-up and said tuned resonant circuit to said pulsed amplifier, a detonation indicating circuit fed by said pulsed amplifier, means fed by said flywheel pick-up to produce a pedestal pulse corresponding to selected ones of said electrical pulses produced by the flywheel pick-up, and having a fixed time relationship thereto, and means for applying said pedestal pulse to said tuned resonant circuit and said pulsed amplifier to cause a portion of said electrical voltages to be superimposed upon the pedestal pulses, the frequency of said electrical voltages being substantially greater than the frequency of said pedestal pulses, to shock excite said tuned resonant circuit at each occurrence of a pedestal pulse, and display means connectable to the output of said pulsed amplifier to show the wave produced by said resonant circuit superimposed upon said pedestal pulse and thus permit accurate determination of the width of said pedestal pulse by counting the number of cycles of said wave thus superimposed.

References Cited in the file of this patent

UNITED STATES PATENTS

| | | |
|---|---|---|
| 2,355,363 | Christaldi | Aug. 8, 1944 |
| 2,448,322 | Piety | Aug. 31, 1948 |
| 2,573,070 | Stafford et al. | Oct. 30, 1951 |
| 2,619,830 | Piety | Dec. 2, 1952 |
| 2,627,546 | Paine | Feb. 3, 1953 |